United States Patent
Ochiai et al.

(10) Patent No.: US 10,151,505 B2
(45) Date of Patent: Dec. 11, 2018

(54) AIR-CONDITIONING APPARATUS

(71) Applicant: Mitsubishi Electric Corporation, Tokyo (JP)

(72) Inventors: Yasutaka Ochiai, Tokyo (JP); Fumitake Unezaki, Tokyo (JP); Makoto Saito, Tokyo (JP); Kiyoshi Yoshimura, Tokyo (JP); Ryoji Abe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 254 days.

(21) Appl. No.: 15/035,365

(22) PCT Filed: Dec. 19, 2013

(86) PCT No.: PCT/JP2013/084003
§ 371 (c)(1),
(2) Date: May 9, 2016

(87) PCT Pub. No.: WO2015/092895
PCT Pub. Date: Jun. 25, 2015

(65) Prior Publication Data
US 2016/0290669 A1 Oct. 6, 2016

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/62* (2018.01); *F24F 11/77* (2018.01); *F24F 11/79* (2018.01);
(Continued)

(58) Field of Classification Search
CPC ........ F24F 11/65; F24F 11/30; F24F 2110/20; F24F 2110/10; F24F 11/79; F24F 11/83;
(Continued)

(56) References Cited

U.S. PATENT DOCUMENTS

| 6,070,110 A * | 5/2000 | Shah ................. F24F 11/0008 165/205 |
| 2011/0198404 A1* | 8/2011 | Dropmann ............ F24F 13/082 236/49.3 |
| 2012/0164930 A1* | 6/2012 | Murayama ......... H05K 7/20745 454/184 |
| 2013/0240043 A1* | 9/2013 | Pham ...................... F04B 39/06 137/1 |

FOREIGN PATENT DOCUMENTS

| EP | 0770829 A2 * | 5/1997 | .............. F24F 11/30 |
| JP | 61-173045 A | 8/1986 | |

(Continued)

OTHER PUBLICATIONS

Extended European Search Report dated Jul. 7, 2017 issued in corresponding EP application No. 13899861.2.
(Continued)

*Primary Examiner* — David Teitelbaum
*Assistant Examiner* — Schyler S Sanks
(74) *Attorney, Agent, or Firm* — Posz Law Group, PLC

(57) ABSTRACT

A mode selection unit selects a continuous operation mode when a dehumidifying operation is started. When an indoor temperature is less than or equal to a set first temperature threshold and indoor humidity is greater than a set humidity threshold in the continuous operation mode, the mode selection unit selects an intermittent operation mode. When the indoor temperature is less than or equal to a set second temperature threshold that is greater than the first temperature threshold and the indoor humidity is less than or equal to the set humidity threshold in the intermittent operation mode, the mode selection unit selects an operation stop mode.

14 Claims, 6 Drawing Sheets

(51) Int. Cl.
*F24F 11/79* (2018.01)
*F24F 11/77* (2018.01)
*F24F 11/83* (2018.01)
*F24F 110/10* (2018.01)
*F24F 110/20* (2018.01)
*F24F 11/65* (2018.01)
*F24F 11/84* (2018.01)
*F24F 11/85* (2018.01)

(52) U.S. Cl.
CPC ............... *F24F 11/83* (2018.01); *F24F 11/65* (2018.01); *F24F 11/84* (2018.01); *F24F 11/85* (2018.01); *F24F 2110/10* (2018.01); *F24F 2110/20* (2018.01)

(58) Field of Classification Search
CPC ............ F24F 11/62; F25B 2700/21172; F25B 2600/2513; F25B 2700/2104
See application file for complete search history.

(56) References Cited

FOREIGN PATENT DOCUMENTS

| | | |
|---|---|---|
| JP | 04-024611 A | 1/1992 |
| JP | 2001-021196 A | 1/2001 |
| JP | 2002-005492 A | 1/2002 |
| JP | 2008-175490 A | 7/2008 |
| JP | 2009-068729 A | 4/2009 |
| JP | 2012-122629 A | 6/2012 |

OTHER PUBLICATIONS

International Search Report of the International Searching Authority dated Mar. 4, 2014 for the corresponding international application No. PCT/JP2013/084003 (and English translation).

* cited by examiner

IN CONTINUOUS OPERATION MODE

IN INTERMITTENT OPERATION MODE

IN OPERATION STOP MODE

AIR-CONDITIONING APPARATUS

CROSS REFERENCE TO RELATED APPLICATION

This application is a U.S. national stage application of International Application No. PCT/JP2013/084003 filed on Dec. 19, 2013, the disclosure of which is incorporated herein by reference.

TECHNICAL FIELD

The present invention relates to an air-conditioning apparatus including a refrigerant circuit having a function of performing a dehumidifying operation.

BACKGROUND ART

There are known heat pump air-conditioning apparatuses including a refrigerant circuit. Some of these air-conditioning apparatuses have a function of performing a dehumidifying operation (refer to Patent Literature 1, for example). Patent Literature 1 discloses an air-conditioning apparatus configured such that a compressor and an indoor fan are in a non-operating state in the dehumidifying operation, when the compressor and the fan are returned to an operating state, the compressor is switched to the operating state and the fan is then switched to the operating state and is driven at a low speed, and after that, such switching between the non-operating and operating state is repeated.

CITATION LIST

Patent Literature

Patent Literature 1: Japanese Examined Patent Application Publication No. H04-24611

SUMMARY OF INVENTION

Technical Problem

At low outdoor air temperatures, however, if control is performed such that switching between the operating and non-operating state of the compressor is repeated as described in Patent Literature 1, the air-conditioning apparatus's capacity to process the sensible heat load from the outside will be increased, so that the temperature will decrease too much. Furthermore, if the temperature and the humidity each become sufficiently low, the dehumidifying operation will be continued, resulting in an increase in power input to an electric motor. In addition, at high outdoor air temperatures, the air-conditioning apparatus's capacity to process the sensible heat load from the outside is low, resulting in an increase in temperature.

The present invention is directed to an air-conditioning apparatus capable of performing dehumidification based on an indoor environment to provide comfort and reducing power consumption.

Solution to Problem

The present invention provides an air-conditioning apparatus that includes a refrigerant circuit having a compressor, a condenser, a pressure reducing device, and an evaporator connected by refrigerant pipes, a humidity sensor measuring, as indoor humidity, the humidity of an air-conditioned room subjected to air-conditioning by the evaporator, a temperature sensor measuring, as an indoor temperature, the temperature of the air-conditioned room, an operation control unit controlling the refrigerant circuit to perform a dehumidifying operation in which the evaporator supplies cooling air, and a mode selection unit selecting, as an operation mode controlled by the operation control unit during the dehumidifying operation, any one of a continuous operation mode in which the refrigerant circuit is continuously operated, an intermittent operation mode in which the refrigerant circuit is intermittently operated, and an operation stop mode of the refrigerant circuit in accordance with the indoor humidity measured by the humidity sensor and the indoor temperature measured by the temperature sensor. When the indoor temperature is less than or equal to a set first temperature threshold and the indoor humidity is greater than a set humidity threshold in the continuous operation mode, the mode selection unit selects the intermittent operation mode. When the indoor temperature is less than or equal to a set second temperature threshold that is greater than the first temperature threshold and the indoor humidity is less than or equal to the set humidity threshold in the intermittent operation mode, the mode selection unit selects the operation stop mode.

Advantageous Effects of Invention

In the air-conditioning apparatus according to the present invention, when the indoor temperature is less than the set first threshold in the continuous operation mode, the continuous operation mode is switched to the intermittent operation mode. The intermittent operation mode is continued until the indoor temperature is equal to the set second threshold that is greater than the set first threshold. This increase in temperature causes a reduction in relative humidity. The air-conditioning apparatus can ensure comfort of the air-conditioned room by utilizing the reduction in relative humidity caused in this manner. Thus, dehumidification with reduced power consumption can be achieved.

DESCRIPTION OF EMBODIMENTS

Figure 1:
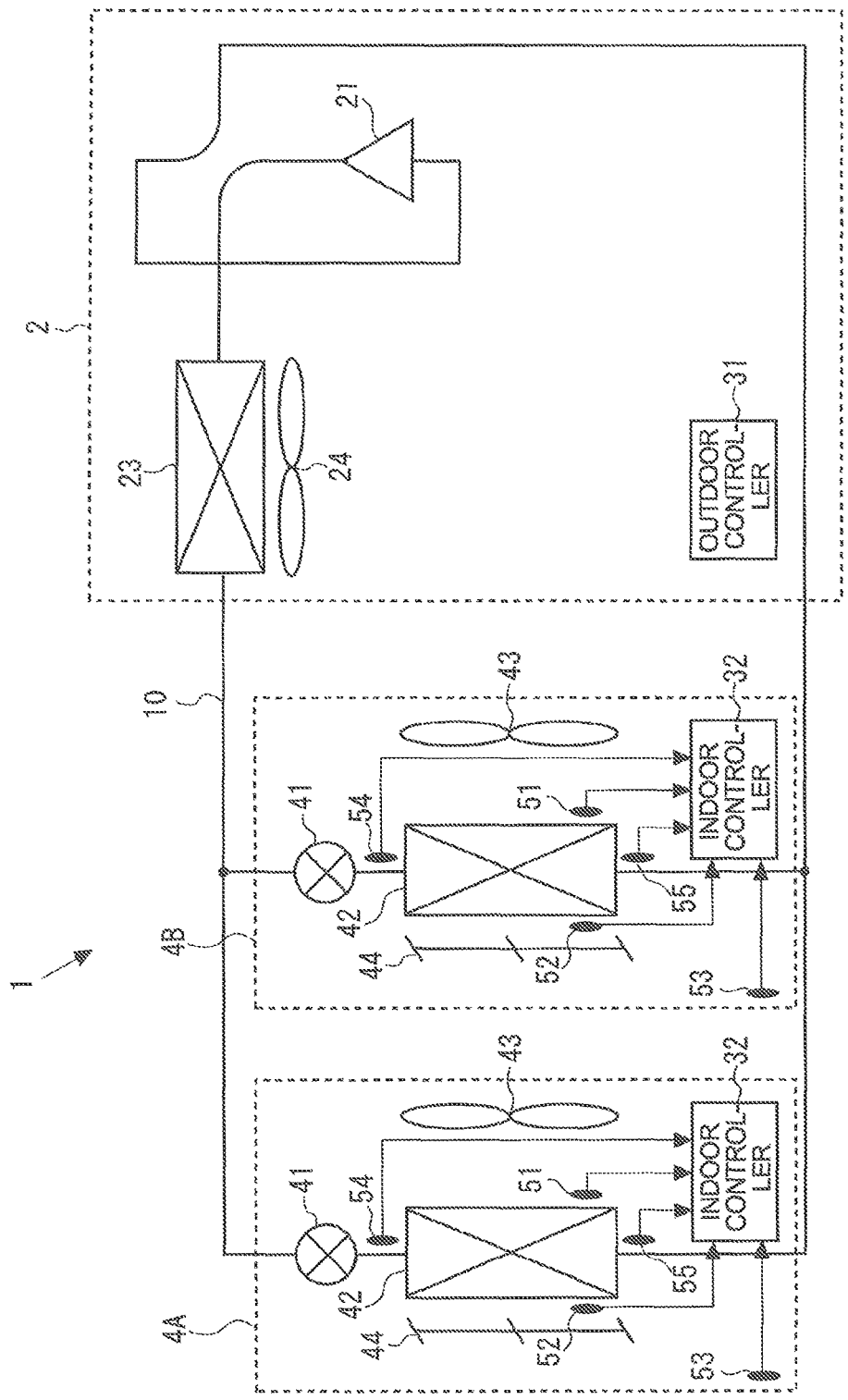
FIG. 1 is a schematic diagram illustrating an exemplary configuration of a refrigerant circuit of an air-conditioning apparatus according to Embodiment of the present invention.

An air-conditioning apparatus according to Embodiment of the present invention will be described below with reference to the drawings. FIG. 1 is a schematic diagram illustrating an exemplary configuration of a refrigerant circuit of the air-conditioning apparatus according to Embodiment of the present invention.

An air-conditioning apparatus 1 of FIG. 1 is installed in, for example, a building or a condominium, and is used to cool or heat an air-conditioned area, where the air-conditioning apparatus 1 is installed, by operating a vapor-compression type refrigerant circuit. Note that the dimensional relationship among components in FIG. 1 and subsequent figures may be different from the actual one.

<Configuration of Air-Conditioning Apparatus 1>

The air-conditioning apparatus 1 mainly includes an outdoor unit 2, serving as a heat source unit, and a plurality of indoor units 4A and 4B, serving as use side units, connected in parallel with the outdoor unit 2. Although FIG. 1 illustrates the two indoor units 4A and 4B connected to the outdoor unit 2, one indoor unit may be connected to the outdoor unit 2, or alternatively, three or more indoor units may be connected to the outdoor unit 2. The air-conditioning apparatus 1 includes a refrigerant circuit 10 formed by connecting the outdoor unit 2 and the indoor units 4A and 4B with refrigerant pipes.

Each of the indoor units 4A and 4B is a ceiling concealed indoor unit concealed in the ceiling of a room in, for example, a building, a ceiling suspended indoor unit suspended from the ceiling of the room, or a wall-mounted indoor unit mounted on a wall of the room. Each of the indoor units 4A and 4B receives cooling energy from the outdoor unit 2 and supplies cooling air to an air-conditioned room. FIG. 1 illustrates a case where the indoor units 4A and 4B have the same configuration. The indoor units 4A and 4B each include an expansion device 41 that functions as an expansion mechanism, an evaporator 42 that is connected in series with the expansion device 41 and functions as a use side heat exchanger, an indoor fan 43 that blows air to the evaporator 42, and a vane 44 that adjusts an angle at which the indoor fan 43 blows air to the air-conditioned room.

The expansion device 41 is disposed on a liquid side of the evaporator 42 to, for example, control the flow rate of refrigerant through an indoor side refrigerant circuit, and reduces the pressure of the refrigerant to expand the refrigerant. The expansion device 41 is, for example, an electronic expansion valve having a variably controllable opening degree. The evaporator 42 is, for example, an indoor heat exchanger disposed in a room, and exchanges heat between the refrigerant and a heat medium (e.g., air or water) to cool indoor air. The evaporator 42 may be, but not limited to, for example, a cross-fin type fin-and-tube heat exchanger that includes heat transfer tubes and many fins.

The indoor fan 43 allows air to exchange heat with the refrigerant in the evaporator 42 and then supplies the air as supply air to the room. The indoor fan 43 is capable of changing the flow rate of air supplied to the evaporator 42. The indoor fan 43 is, for example, a centrifugal fan or a multi-blade fan driven by, for example, a DC fan motor. The evaporator 42 may perform heat exchange between the refrigerant and a heat medium that differs from air (for example, water or brine). The vane 44 adjusts the angle at which the air is blown from the indoor fan 43 to the air-conditioned room through the evaporator 42.

The outdoor unit 2 has a function of supplying cooling energy or heating energy to the indoor units 4A and 4B, and is placed, for example, outside the building. The outdoor unit 2, which is connected to the indoor units 4A and 4B by the refrigerant pipes, is a portion of the refrigerant circuit 10. In other words, the refrigerant flows between the outdoor unit 2 and the indoor units 4A and 4B through the refrigerant pipes. In the outdoor unit 2, a compressor 21 is connected in series with a condenser 23, serving as a heat source side heat exchanger.

The compressor 21 sucks the refrigerant and compresses the refrigerant into a high temperature, high pressure state. The compressor 21 is capable of changing its operating capacity. The compressor 21 may be, for example, a positive displacement compressor and the like that is driven by a motor whose frequency is controlled by an inverter. FIG. 1 illustrates the case where the single compressor 21 is disposed, but the present invention is not limited thereto. Any number of compressors 21 may be arranged. Two or more compressors 21 may be arranged in parallel in accordance with, for example, the number of indoor units 4A and 4B added.

The condenser 23 is, for example, an outdoor heat exchanger placed in an outdoor space, and exchanges heat between the refrigerant and the heat medium (e.g., air or water) to condense and liquefy the refrigerant. The condenser 23 may be, but not limited to, for example, a cross-fin type fin-and-tube heat exchanger that includes heat transfer tubes and many fins.

The outdoor unit 2 includes an outdoor fan 24, serving as an air-sending device for sucking outdoor air into the unit, allowing the air to exchange heat with the refrigerant in the condenser 23, and discharging the air to the outdoor space. The outdoor fan 24 is capable of changing the flow rate of air supplied to the condenser 23. The outdoor fan 24 is, for example, a propeller fan that is driven by a motor, such as a DC fan motor. The condenser 23 may have another configuration. For example, the condenser 23 may exchange heat between the refrigerant and a heat medium that differs from air (for example, water or brine).

Figure 2:
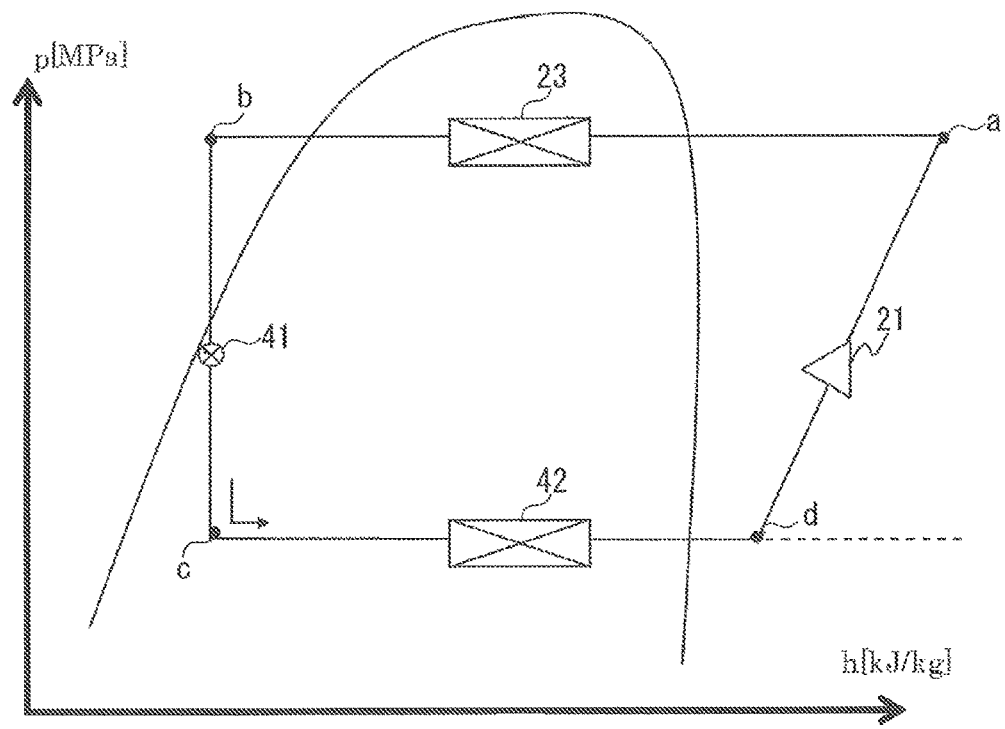
FIG. 2 is a p-h diagram in a cooling operation of the air-conditioning apparatus of FIG. 1.

FIG. 2 is a graph illustrating a p-h diagram in a cooling operation of the air-conditioning apparatus of FIG. 1. An exemplary operation of the air-conditioning apparatus will now be described with reference to FIGS. 1 and 2. Low temperature, low pressure refrigerant is compressed into high temperature, high pressure gas refrigerant by the compressor 21, and is then discharged from the compressor 21 (point a in FIG. 2). The high temperature, high pressure gas refrigerant discharged from the compressor 21 flows into the condenser 23. The refrigerant that has flowed into the condenser 23 condenses and liquefies while transferring heat to outdoor air blown by an air blowing operation of the outdoor fan 24 (point b in FIG. 2).

After that, the high pressure liquid refrigerant flows out of the condenser 23. The expansion device 41 reduces the pressure of the refrigerant, so that the refrigerant turns into low pressure, two-phase gas-liquid refrigerant (point c in FIG. 2). The refrigerant then flows out of the outdoor unit 2. The low pressure gas refrigerant leaving the outdoor unit 2 flows into the indoor units 4A and 4B. In each of the indoor units 4A and 4B, the refrigerant flows into the evaporator 42, and removes heat from air blown by the air blowing operation of the indoor fan 43, so that the refrigerant evaporates and gasifies (point d in FIG. 2). At this time, the air-conditioned room is cooled by the evaporator 42 and the indoor fan 43. After that, the refrigerant flows into the outdoor unit 2 and is again sucked into the compressor 21.

Figure 3:
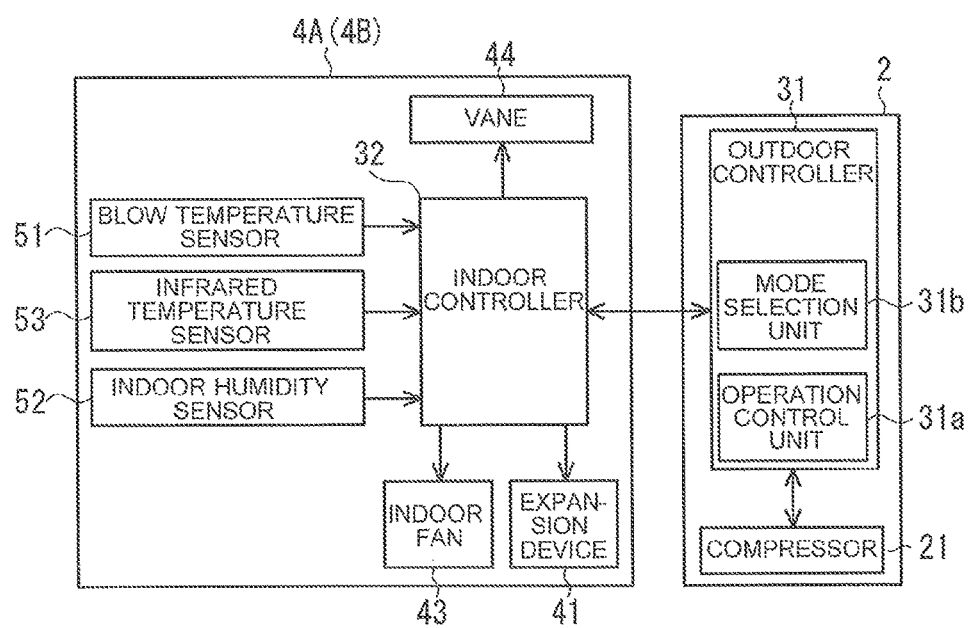
FIG. 3 is a block diagram illustrating the configuration of the air-conditioning apparatus of FIG. 1.

The above-described operation of the air-conditioning apparatus 1 is controlled by an outdoor controller 31 and indoor controllers 32. The outdoor controller 31 and the indoor controllers 32 each include, for example, a microcomputer. FIG. 3 is a block diagram illustrating the configuration of the air-conditioning apparatus of FIG. 1. As illustrated in FIGS. 1 and 3, the outdoor unit 2 includes the outdoor controller 31 that controls operations of the components in the outdoor unit 2, and the indoor units 4A and 4B each include the indoor controller 32 that controls operations of the components in the corresponding one of the indoor units 4A and 4B. The outdoor controller 31 is connected to each of the indoor controllers 32 such that the controllers can transmit and receive information to and from each other. The outdoor controller 31 cooperates with the indoor controllers 32 to control the operation of the entire air-conditioning apparatus 1.

The outdoor controller 31 and the indoor controllers 32 perform control in accordance with outputs from various sensors. Specifically, each of the indoor units 4A and 4B includes, at an indoor air inlet, a blow temperature sensor 51 that detects, as a suction temperature T1, the temperature of air sucked into the evaporator 42 and an indoor humidity sensor 52 that detects, as indoor humidity RH, the humidity of the air sucked into the evaporator 42. Each of the indoor units 4A and 4B further includes an infrared temperature sensor 53 that is disposed on the ceiling of the air-conditioned room and measures, as an infrared temperature T2, the surface temperature of a wall or floor of the room or a person in the room from above. Each of the indoor controllers 32 has a set temperature for the air-conditioned room. The indoor controller 32 performs control so that the suction temperature T1 or the infrared temperature T2 (indoor temperature Tin) reaches the set temperature. In addition, a refrigerant inlet temperature sensor 54 is disposed at an inlet of the evaporator 42 and a refrigerant outlet temperature sensor 55 is disposed at an outlet of the evaporator 42 so that the degree of superheat at the outlet of the evaporator 42 can be calculated.

The air-conditioning apparatus 1 has a function of performing a dehumidifying operation for dehumidifying an air-conditioned room in addition to the above-described cooling operation (refer to FIG. 2). In this case, the air-conditioning apparatus 1 performs a moderate cooling and dehumidifying operation for performing an operation such that the refrigerant flows in the same manner as that in the cooling operation and the sensible-heat factor (SHF) is less than that in the cooling operation. Furthermore, in the dehumidifying operation, the outdoor controller 31 and each indoor controller 32 control the operation in accordance with conditions of the air-conditioned room. Specifically, the outdoor controller 31 and the indoor controller 32 classify conditions of the air-conditioned room into three types of conditions, namely, high temperature conditions, low temperature, high humidify conditions, and low temperature, low humidity conditions in accordance with the indoor temperature Tin and the indoor humidity RH. The outdoor controller 31 and the indoor controller 32 change control of, for example, the compressor 21, the expansion device 41, and the indoor fan 43 for each type of the conditions, thus performing control so that an operation with small power input to the compressor is achieved while a comfortable state is maintained.

The outdoor controller 31 includes an operation control unit 31a and a mode selection unit 31b. The operation control unit 31a controls the operation of the outdoor unit 2 and that of the refrigerant circuit 10, and further controls the operations of the indoor units 4A and 4B via the indoor controllers 32. The operation control unit 31a determines the rate of increase in compressor frequency based on the difference between the indoor temperature Tin and the set temperature, and determines the frequency of the compressor 21. To perform the dehumidifying operation, the operation control unit 31a controls the entire apparatus so that the apparatus performs the moderate cooling and dehumidifying operation in which an evaporating temperature in the refrigerant circuit is made less than that in the cooling operation and the sensible-heat factor is less than that in the cooling operation.

To perform the above-described dehumidifying operation, the mode selection unit 31b selects any one of a continuous operation mode, an intermittent operation mode, and an operation stop mode in accordance with the indoor temperature Tin and the indoor humidity RH. The operation control unit 31a performs control in the operation mode selected by the mode selection unit 31b. The continuous operation mode is a dehumidifying operation mode for conditions where the indoor temperature Tin is high. In this mode, the refrigerant circuit 10 is continuously operated. The intermittent operation mode is a dehumidifying operation mode for conditions where the indoor temperature is low and the indoor humidity is high. In this mode, the refrigerant circuit 10 periodically switches between an operating state and a non-operating state. The operation stop mode is a mode in which the operation of the refrigerant circuit 10 is stopped because of low humidity conditions where dehumidification is not needed.

In this case, the mode selection unit 31b compares the suction temperature T1 with the infrared temperature T2, and uses the greater of these temperatures as the indoor temperature Tin. As described above, since the infrared temperature sensor 53 is disposed on the ceiling to grasp a temperature condition of lower part of the room, the dehumidifying operation responsive to a load can be achieved. Specifically, a typical related art air-conditioning apparatus includes a temperature sensor disposed only at an air inlet on the ceiling of a room. If the number of people in a room, such as a conference room, increases rapidly, a sensor measurement value could not respond to a rapidly increased load. Unfortunately, uncomfortable conditions may continue. In contrast, the mode selection unit 31b compares the suction temperature T1 with the infrared temperature T2, and uses the greater of these temperatures as the indoor temperature Tin so that the dehumidifying operation immediately responding to a load can be achieved.

The mode selection unit 31b has a first temperature threshold T1ref, a second temperature threshold T2ref, and humidity thresholds (a lower limit humidity threshold RH1ref and an upper limit humidity threshold RH2ref), and selects any one of the operation modes in accordance with a region to which both the indoor temperature Tin and the indoor humidity RH of the air-conditioned room belong. Note that the mode selection unit 31b selects the continuous operation mode at the start of the dehumidifying operation. The lower limit humidity threshold RH1ref is set to, for example, 40% relative humidity. The upper limit humidity threshold RH2ref is set to, for example, 60% relative humidity. Since typical comfortable humidity ranges from 40% to 60%, the above-described set humidity thresholds RH1ref and RH2 are set to 40 relative humidity and 60 relative humidity, respectively, but the present invention is not limited thereto. Other humidity thresholds that allow the air-conditioned room to be a comfortable space may be set.

Figure 4:
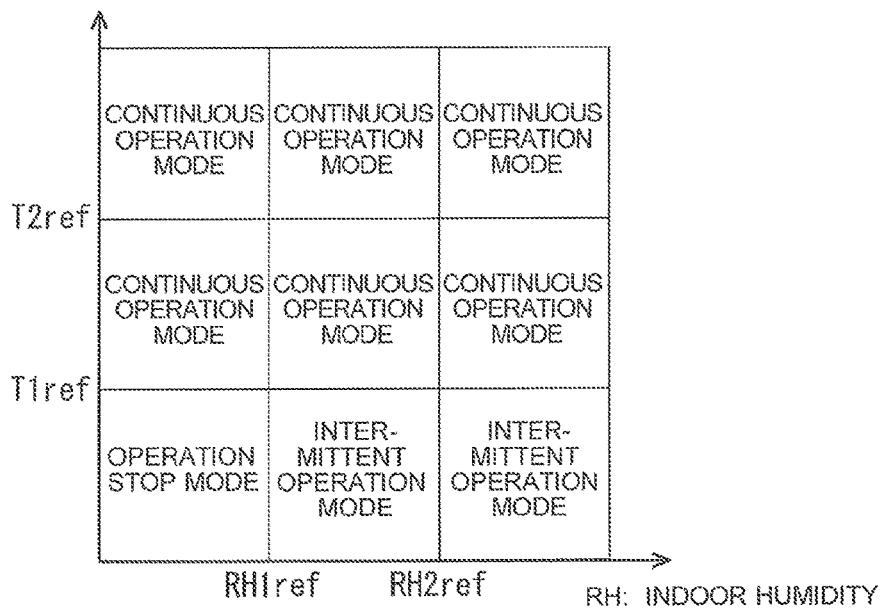
FIG. 4 is a schematic diagram illustrating the classification of operation modes based on an indoor temperature and relative humidity in a continuous operation mode of a dehumidifying operation of the air-conditioning apparatus in FIG. 3.

FIG. 4 is a schematic diagram illustrating the classification of the operation modes based on the indoor temperature and the relative humidity in the continuous operation mode of the dehumidifying operation of the air-conditioning apparatus in FIG. 3. In the continuous operation mode of FIG. 4, when the indoor temperature Tin is greater than the first temperature threshold T1ref, the mode selection unit 31b selects the continuous operation mode regardless of the indoor humidity RH. When the indoor temperature Tin is less than or equal to the first temperature threshold T1ref in the continuous operation mode, the mode selection unit 31b performs switching from the continuous operation mode to the intermittent operation mode or the operation stop mode. Specifically, when the indoor humidity RH is greater than the lower limit humidity threshold RH1ref (40% relative humidity), the mode selection unit 31b selects the intermittent operation mode. On the other hand, when the indoor humidity RH is less than or equal to the lower limit humidity threshold RH1ref (40% relative humidity), the mode selection unit 31b selects the operation stop mode to stop the operation of the refrigerant circuit 10.

Figure 5:
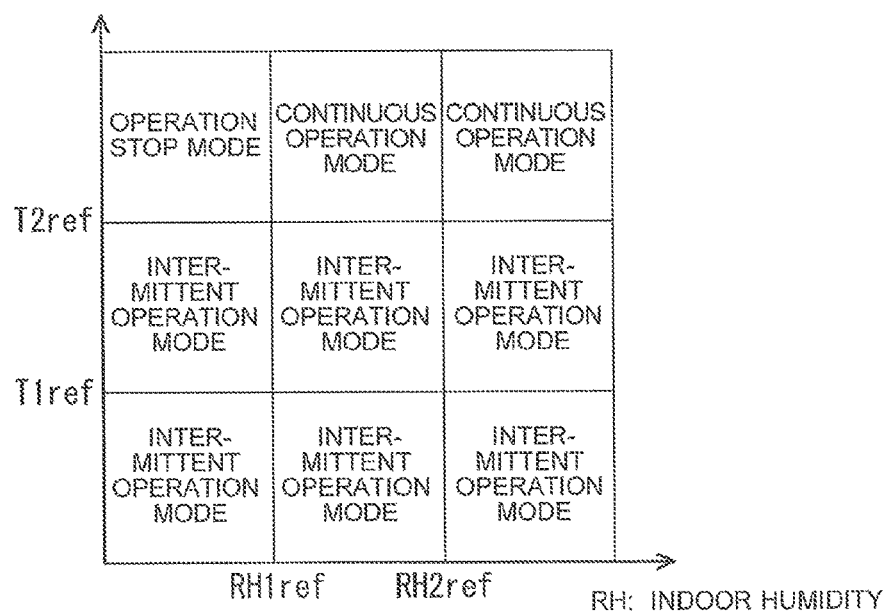
FIG. 5 is a schematic diagram illustrating the classification of the operation modes based on the indoor temperature and the relative humidity in an intermittent operation mode of the dehumidifying operation of the air-conditioning apparatus in FIG. 3.

FIG. 5 is a schematic diagram illustrating the classification of the operation modes based on the indoor temperature and the relative humidity in the intermittent operation mode of the dehumidifying operation of the air-conditioning apparatus in FIG. 3. In the intermittent operation mode of FIG. 5, when the indoor temperature Tin is less than or equal to the second temperature threshold T2ref that is greater than the first temperature threshold T1ref, the mode selection unit 31b continues the intermittent operation mode. In other words, if the indoor temperature Tin exceeds the first temperature threshold T1ref, the intermittent operation mode will not be switched to another mode, but continue. When the indoor temperature Tin is greater than the second temperature threshold T2ref and the indoor humidity RH is less than or equal to the lower limit humidity threshold RH1ref (40% relative humidity), the mode selection unit 31b determines that sufficient dehumidification has been achieved, and selects the operation stop mode. When the indoor temperature Tin is greater than the second temperature threshold T2ref, the mode selection unit 31b again selects the continuous operation mode.

Figure 6:
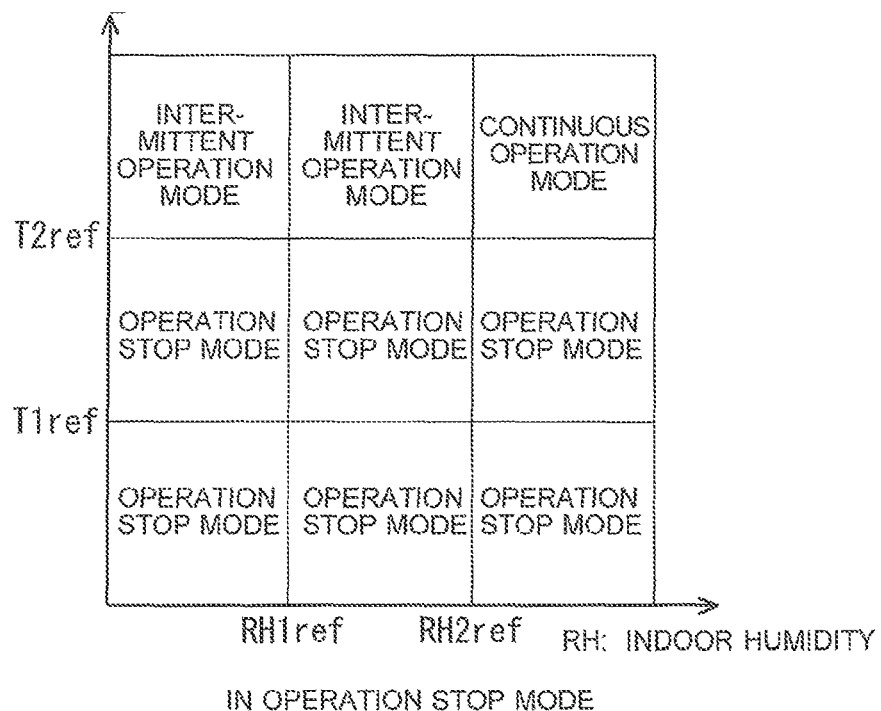
FIG. 6 is a schematic diagram illustrating the classification of the operation modes based on the indoor temperature and the relative humidity in an operation stop mode of the dehumidifying operation of the air-conditioning apparatus in FIG. 3.

FIG. 6 is a schematic diagram illustrating the classification of the operation modes based on the indoor temperature and the relative humidity in the operation stop mode of the dehumidifying operation of the air-conditioning apparatus in FIG. 3. In the operation stop mode of FIG. 6, when the indoor temperature Tin is greater than the second temperature threshold T2ref and the indoor humidity RH is greater than the upper limit humidity threshold RH2ref (60% relative humidity), the mode selection unit 31b selects the continuous operation mode with high latent heat capacity. When the indoor temperature Tin is greater than the second temperature threshold T2ref and the indoor humidity RH is less than or equal to the upper limit humidity threshold RH2ref (60% relative humidity), the mode selection unit 31b selects the intermittent operation mode.

As described above, the first temperature threshold T1ref and the second temperature threshold T2ref are allowed to have a certain difference therebetween, and the lower limit humidity threshold RH1ref and the upper limit humidity threshold RH2ref are allowed to have a certain difference therebetween. Thus, a comfortable space based on conditions of the air-conditioned room can be provided with low power consumption. In addition, hunting caused upon switching between operations can be prevented. In other words, the refrigerant circuit 10 performs the dehumidifying operation in the intermittent operation mode, thus achieving a comfortable environment while suppressing a reduction in indoor temperature Tin. In the intermittent operation mode, the relative humidity tends to decrease. This facilitates switching from the intermittent operation mode to the operation stop mode for low temperature, low humidity conditions, thus reducing the power consumption.

Figure 7:
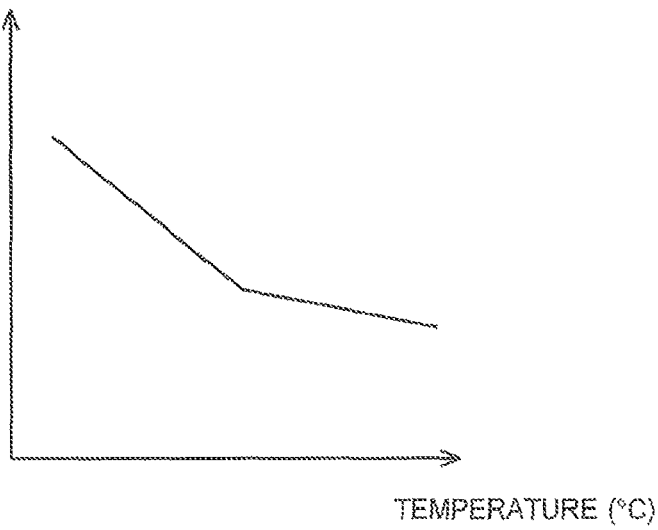
FIG. 7 is a graph illustrating the relationship between a temperature and relative humidity at constant absolute humidity.

Specifically, FIG. 7 is a graph illustrating the relationship between the temperature and the relative humidity at constant absolute humidity. Referring to FIG. 7, at constant absolute humidity, the relative humidity decreases with increasing temperature. In the continuous operation mode, the indoor temperature decreases and the relative humidity increases accordingly. In contrast, in the intermittent operation mode, the indoor temperature increases while the operation is stopped, so that the relative humidity decreases as compared with that in the continuous operation in spite of the fact that the absolute humidity is high. In particular, in the intermittent operation mode, when the indoor temperature Tin is greater than the first temperature threshold T1ref, the intermittent operation mode is continued, and when the indoor temperature Tin is greater than the second temperature threshold T2ref, the intermittent operation mode is again switched to the continuous operation mode. This promotes the reduction of the relative humidity with increasing indoor temperature Tin, thus achieving a reduction in power consumption.

When the relative humidity decreases due to dehumidification in the above-described continuous and intermittent operation modes, a person does not feel uncomfortable in an area with low relative humidity. While the refrigerant circuit 10 is operated under low humidity conditions, the sensible-heat factor (SHF) is high and only sensible heat processing is performed. It is therefore unnecessary to perform the dehumidifying operation. The mode selection unit 31b selects the operation stop mode accordingly.

Figure 8:
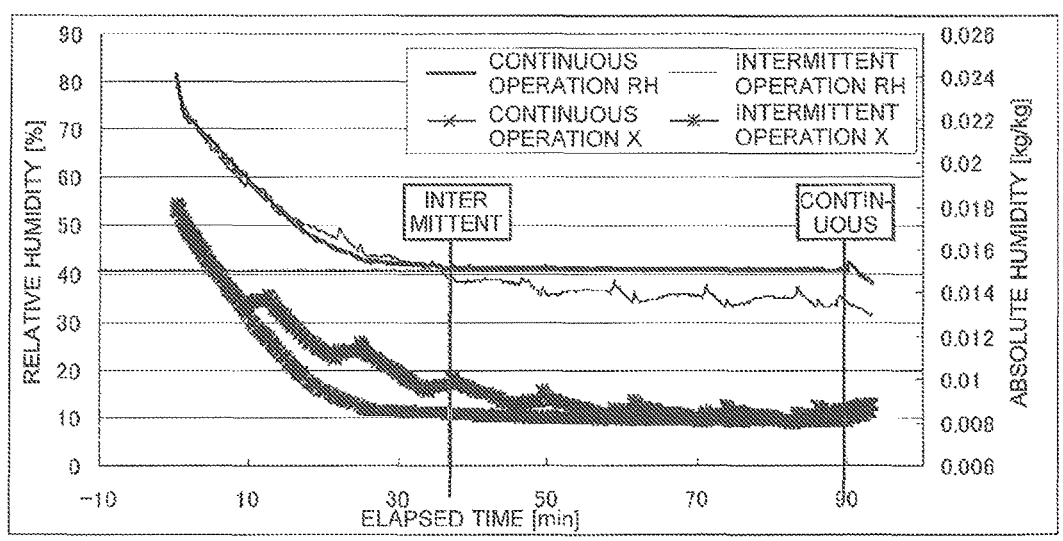
FIG. 8 is a graph illustrating a change in relative humidity and a change in absolute humidity over time in the intermittent operation and those in the continuous operation of the air-conditioning apparatus of FIG. 1.

As described above, the dehumidifying operation is intermittently performed under high humidity conditions, and when the conditions change to low humidity conditions, the operation is sifted to the operation stop mode. This facilitates rapid access to a region with low relative humidity. In addition, the time of actual operation is short. Consequently, the dehumidifying operation with reduced power consumption can be achieved. Specifically, FIG. 8 is a graph illustrating a change in relative humidity and a change in absolute humidity over time in the continuous operation and those in the intermittent operation under conditions where the compressor frequency is fixed. Referring to FIG. 8, whereas the time elapsed until the relative humidity reaches 40% is 35 minutes in the intermittent operation, the time elapsed until the relative humidity reaches 40% is longer, or 90 minutes in the continuous operation. In the intermittent operation mode, a reduction in indoor temperature Tin can be suppressed under low humidity conditions where the air-conditioning apparatus 1 is in the non-operating state, thus providing comfort.

Furthermore, the operation control unit 31a performs control so that the air flow rate through the indoor fan 43 in the intermittent operation mode is less than that in the continuous operation mode. For example, the operation control unit 31a controls the indoor fan 43 through the indoor controller 32 so that the indoor fan 43 outputs air at a minimum flow rate. Consequently, the amount of dehumidification in the intermittent operation mode is increased in the air-conditioned room under low temperature, high humidity conditions, thus achieving a reduction in power consumption. As described above, the driving frequency of the compressor 21 is determined by the difference between the indoor temperature Tin and the set temperature. The driving frequency of the compressor 21 for the air-conditioned room under low temperature conditions is less than that under high temperature conditions, resulting in an increase in evaporating temperature. To increase the amount of latent heat processed under low temperature conditions, therefore, the operation has to be performed such that the air flow rate is reduced to reduce the SHF. In the intermittent operation mode, the indoor fan 43 is controlled so that the air flow rate through the indoor fan 43 is reduced, thus achieving a reduction in power consumption.

Under high temperature conditions, the compressor frequency is high, the evaporating temperature is generally low, and the sensible heat load is large. It is preferred to increase the air flow rate through the indoor fan 43.

Furthermore, the operation control unit 31a performs control so that the amount of expansion by the expansion device 41 in the intermittent operation mode is less than that in the continuous operation mode. For example, the operation control unit 31a controls the expansion device 41 so that the degree of superheat at the outlet of the evaporator 42 is 10 degrees C. In the intermittent operation mode for the air-conditioned room under low temperature, high humidity conditions, the opening degree of the expansion device 41 is made less than that in the continuous operation mode for the air-conditioned room under high temperature conditions, so that the amount of dehumidification can be increased and the power consumption can be reduced. The reason is as follows. Reducing the opening degree of the expansion device 41 increases the degree of superheat at the outlet of the evaporator, so that a gas refrigerant area is generated. This causes the evaporating temperature to decrease, thus increasing the amount of dehumidification. Additionally, the increase of the degree of superheat at the outlet of the evaporator 42 results in a reduction in suction density of the compressor 21, leading to a reduction in compressor input to the compressor 21.

To provide a comfortable space with low compressor input, the operation control unit 31a further has a function of changing the angle of the vane 44 in accordance with the air flow rate through the indoor fan 43 to control the area of an air outlet. Specifically, the operation control unit 31a performs control such that the angle of the vane is maximized at a maximum air flow rate through the fan, the angle of the vane is changed in response to a reduction in air flow rate through the fan, and the air outlet is closed while the fan is in the non-operating state.

For example, if the air flow rate through the fan shifts from a high level to a low level at the maximum angle of the vane, the reduction of the air flow rate may hinder stable air blowing, so that high humidity air may contact part of the vane cooled by blown air and condensation may form on the part (water droplet formation). Furthermore, the formed condensation may be blown off by the blown air, causing water droplet scattering. To prevent the water droplet formation and the water droplet scattering, an air-blowing control unit changes the angle of the vane 44 in accordance with the air flow rate through the indoor fan 43 to change the area of the air outlet. This stabilizes the velocity of blown air, thus preventing the condensation and the water droplet scattering.

Figure 9:
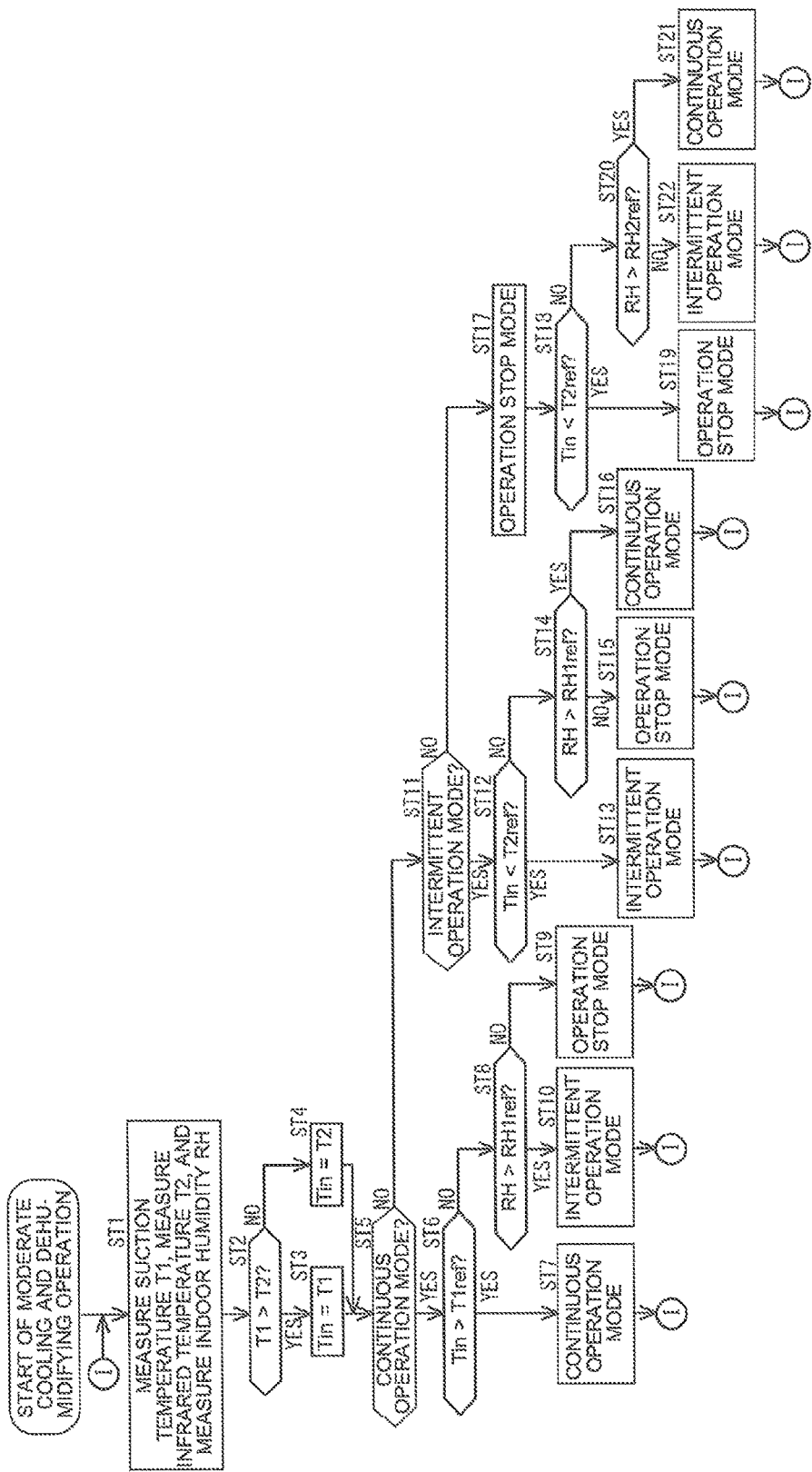
FIG. 9 is a flowchart of an exemplary operation of the air-conditioning apparatus of FIG. 1.

FIG. 9 is a flowchart illustrating an exemplary operation of the air-conditioning apparatus of FIG. 1. The exemplary operation of the air-conditioning apparatus 1 will be described with reference to FIGS. 1 to 9. When the dehumidifying operation is selected in accordance with, for example, a user operation, the blow temperature sensor 51 measures the suction temperature T1, the indoor humidity sensor 52 measures the indoor humidity RH, and the infrared temperature sensor 53 measures the infrared temperature T2 (step ST1). Then, the suction temperature T1 is compared with the infrared temperature T2 (step ST2). The greater of the suction temperature T1 and the infrared temperature T2 is determined as the indoor temperature Tin (step ST3 or ST4).

After that, whether the mode of the dehumidifying operation is the continuous operation mode is determined (step ST5). Note that the continuous operation mode is selected at the start of the dehumidifying operation. If the operation mode is the continuous operation mode, whether the indoor temperature Tin is greater than the first temperature threshold T1ref is determined (step ST6; refer to FIG. 4). If the indoor temperature Tin is greater than the first temperature threshold T1ref, the continuous operation mode is continued (step ST7). The dehumidifying operation in the continuous operation mode allows the indoor temperature Tin and the indoor humidity RH to gradually decrease. The continuous operation mode is continued until the indoor temperature Tin is less than or equal to the first temperature threshold T1ref (steps ST1 to ST7).

On the other hand, if the indoor temperature Tin is less than or equal to the first temperature threshold T1ref, whether the indoor humidity RH is greater than the lower limit humidity threshold RH1ref is determined (step ST8). If the indoor humidity RH is less than the lower limit humidity threshold RH1ref, it is determined that sufficient dehumidification has been achieved to provide comfort, the operation stop mode is selected, and the operation of the refrigerant circuit 10 is stopped (step ST9). On the other hand, if the indoor humidity RH is greater than the lower limit humidity threshold RH1ref, it is determined that it is under low temperature, high humidity conditions, the intermittent operation mode is selected, and the dehumidifying operation in the intermittent operation mode is performed (step ST10). Consequently, the indoor temperature Tin increases as compared with that in the continuous operation mode, and the relative humidity decreases accordingly.

If the operation mode is the intermittent operation mode (step ST11), whether the indoor temperature Tin is less than the second temperature threshold T2ref is determined (step ST12). If the indoor temperature Tin is less than the second temperature threshold T2ref, the intermittent operation mode is continuously performed (step ST13). In this case, the indoor temperature Tin of the air-conditioned room increases and the indoor humidity RH decreases accordingly, so that comfort of the air-conditioned room is improved while the power consumption is reduced.

If the indoor temperature Tin is greater than or equal to the second temperature threshold T2ref (step ST12), whether the indoor humidity RH is greater than the lower limit humidity threshold RH1ref is determined (step ST14). If the indoor humidity RH is less than a first humidity threshold RHref, it is determined that sufficient dehumidification has been achieved to provide comfort, the operation stop mode is selected, and the operation of the refrigerant circuit 10 is stopped (step ST15). On the other hand, if the indoor humidity RH increases due to a latent heat load and exceeds the lower limit humidity threshold RH1ref, the intermittent operation mode is again switched to the continuous operation mode (step ST16).

If the operation mode is the operation stop mode (step ST17), the indoor temperature Tin and the indoor humidity RH are continuously monitored. While the indoor temperature Tin is less than the second temperature threshold T2ref, the operation remains stopped (step ST19). On the other hand, if the indoor temperature Tin is greater than or equal to the second temperature threshold T2ref (step ST18), the continuous operation mode or the intermittent operation mode is again started. Specifically, if the indoor humidity RH is greater than the upper limit humidity threshold RH2ref (step ST20), the continuous operation mode is selected (step ST21). If the indoor humidity RH is less than or equal to the upper limit humidity threshold RH2ref, the intermittent operation mode is selected (step ST22).

As described above, the continuous operation mode allows the indoor temperature Tin to decrease to the first temperature threshold T1ref and, after that, the dehumidifying operation in the intermittent operation mode is performed. The intermittent operation mode is continued until the indoor temperature Tin increases to the second temperature threshold T2 or until the indoor humidity RH decreases to the lower limit humidity threshold RH1ref or less, so that comfort can be improved by utilizing a reduction in relative humidity with increasing temperature. This achieves dehumidification to provide a comfortable space while reducing the power consumption.

In addition, since the greater of the suction temperature T1 measured by the blow temperature sensor 51 and the infrared temperature T2 measured by the infrared temperature sensor 53 is used as the indoor temperature Tin, an increase in load in the room can be detected early. This can prevent uncomfortable conditions from being continued.

Additionally, since the air flow rate through the indoor fan 43 is controlled in the intermittent operation mode such that the air flow rate is less than that in the continuous operation mode, the amount of dehumidification can be increased in the intermittent operation mode for the air-conditioned room under low temperature, high humidity conditions, and the power consumption can be reduced. In addition, since the amount of expansion by the expansion device 41 is controlled in the intermittent operation mode such that the amount of expansion is less than that in the continuous operation mode, the amount of dehumidification can be increased in the intermittent operation mode, and the power consumption can be reduced. Moreover, since the area of the air outlet is controlled by changing the angle of the vane 44 in accordance with the air flow rate through the indoor fan 43 controlled in the above-described manner, water droplet formation on the air outlet or water droplet scattering can be prevented.

Embodiment of the present invention is not limited to Embodiment described above. For example, although FIG. 1 illustrates the air-conditioning apparatus 1 performing the cooling operation, the air-conditioning apparatus 1 may perform a heating operation as well as the cooling operation. In this case, a flow switching device including a four-way valve may be disposed on a discharge side of the compressor 21 to enable switching between a cooling passage in the cooling operation and a heating passage in the heating operation.

In addition, although FIG. 3 illustrates the configuration in which the operation control unit 31a and the mode selection unit 31b are provided on the side of the outdoor controller 31, these units may be provided on the side of the indoor controller 32 or may be provided on the side of a control unit that is separate from the outdoor unit 2 and the indoor units 4 and that controls the air-conditioning apparatus 1.

REFERENCE SIGNS LIST

1: air-conditioning apparatus; 2: outdoor unit; 4A, 4B: indoor unit; 10: refrigerant circuit; 21: compressor; 23: condenser; 24: outdoor fan; 31: outdoor controller; 31a: operation control unit; 31b: mode selection unit; 32: indoor controller; 41: expansion device; 42: evaporator; 43: indoor fan; 44: vane; 51: blow temperature sensor; 52: indoor humidity sensor; 53: infrared temperature sensor; RH: indoor humidity; RH1ref: upper limit humidity threshold; RH2ref: lower limit humidity threshold; T1: suction temperature; T1ref: first temperature threshold; T2: infrared temperature; T2ref: second temperature threshold; and Tin: indoor temperature.

The invention claimed is:

1. An air-conditioning, apparatus comprising: a refrigerant circuit having a compressor, a condenser, a pressure reducing device, and an evaporator connected by refrigerant pipes; a humidity sensor that measures, as indoor humidity, humidity of an air-conditioned room subjected to air-conditioning by the evaporator; a temperature sensor that measures, as an indoor temperature, a temperature of the air-conditioned room; an indoor fan that blows air to the evaporator; and a controller configured to control the refrigerant circuit to dehumidify the air-conditioned room and, based on a measured indoor temperature as measured by the temperature sensor and a measured indoor humidity as measured by the humidity sensor, select one of a continuous operation mode in which the refrigerant circuit is continuously operated, an intermittent operation mode in which the refrigerant circuit is intermittently operated, and an operation stop mode in which the refrigerant circuit is stopped, the continuous operation mode, intermittent operation mode and operation stop mode sharing a first temperature threshold, a second temperature threshold and a humidity threshold, the controller being configured to: initiate control in the continuous operation mode; during execution of the continuous operation mode, switch from the continuous operation mode to the intermittent operation mode when the measured indoor temperature is less than or equal to the first temperature threshold and the measured indoor humidity is greater than the humidity threshold, and during execution of the intermittent operation mode, switch from the intermittent operation mode to the operation stop mode when the measured indoor temperature is greater than the second temperature threshold, where the second temperature threshold is greater than the first temperature threshold and the measured indoor humidity is less than or equal to the humidity threshold.

2. The air-conditioning apparatus of claim 1, wherein, during execution of the continuous operation mode, the controller performs switching from the continuous operation mode to the operation stop mode when the measured indoor temperature is less than or equal to the first temperature threshold and the measured indoor humidity is less than or equal to the humidity threshold.

3. The air-conditioning apparatus of claim 1, wherein, during execution of the intermittent operation mode, the controller performs switching from the intermittent operation mode to the continuous operation mode when the measured indoor temperature is greater than the second temperature threshold and the measured indoor humidity is greater than the humidity threshold.

4. The air-conditioning apparatus of claim 1, wherein the humidity threshold is a first humidity threshold and the air-conditioning apparatus comprises a second humidity threshold, and during execution of the operation stop mode:
when the measured indoor temperature is less than the second temperature threshold, the controller continues the operation stop mode,
when the measured indoor temperature is greater than or equal to the second temperature threshold and the measured indoor humidity is greater than the second humidity threshold in the operation stop mode, the controller performs switching from the operation stop mode to the continuous operation mode, and
when the measured indoor temperature is greater than or equal to the second temperature threshold and the measured indoor humidity is less than or equal to the second humidity threshold in the operation stop mode, the controller performs switching from the operation stop mode to the intermittent operation mode.

5. The air-conditioning apparatus of claim 1,
wherein the controller controls the indoor fan such that an air flow rate through the indoor fan in the intermittent operation mode is less than that in the continuous operation mode.

6. The air-conditioning apparatus of claim 5, comprising:
a vane that adjusts an angle at which the indoor fan blows air,
wherein the controller has a function of adjusting the angle of the vane to reduce an area of an air outlet in accordance with the air flow rate through the indoor fan.

7. The air-conditioning apparatus of claim 1, wherein the controller controls the pressure reducing device such that an opening degree of the pressure reducing device in the intermittent operation mode is less than that in the continuous operation mode.

8. The air-conditioning apparatus of claim 1, wherein the temperature sensor includes
a suction temperature sensor disposed at an air inlet of the evaporator, the suction temperature sensor measuring, as a suction temperature, a temperature of air sucked into the evaporator and
an infrared temperature sensor disposed in the air-conditioned room, the infrared temperature sensor measuring, as an infrared temperature, the temperature of the air-conditioned room, and
wherein when the infrared temperature is greater than the suction temperature, the controller uses the infrared temperature as the measured indoor temperature, and when the suction temperature is greater than the infrared temperature, the controller uses the suction temperature as the measured indoor temperature.

9. The air-conditioning apparatus of claim 1, wherein the temperature sensor is an infrared temperature sensor.

10. The air-conditioning apparatus of claim 1, wherein the controller controls supply of cooling air during the dehumidifying.

11. An air-conditioning apparatus comprising: a refrigerant circuit having a compressor, a condenser, a pressure reducing device, and an evaporator connected by refrigerant pipes; a humidity sensor that measures, as indoor humidity, humidity of an air-conditioned room subjected to air-conditioning by the evaporator; a temperature sensor that measures, as an indoor temperature, a temperature of the air-conditioned room; an indoor fan that blows air to the evaporator; and a controller configured to control the refrigerant circuit to dehumidify the air-conditioned room and, based on a measured indoor temperature as measured by the temperature sensor and a measured indoor humidity as measured by the humidity sensor, select one of a continuous operation mode in which the refrigerant circuit is continuously operated, an intermittent operation mode in which the refrigerant circuit is intermittently operated, and an operation stop mode in which the refrigerant circuit is stopped, the continuous operation mode, intermittent operation mode and operation stop mode sharing a first temperature threshold, a second temperature threshold, a lower limit humidity threshold, and an upper limit humidity threshold, the controller being configured to; initiate control in the continuous operation mode; during execution of the continuous operation mode, switch from the continuous operation mode to the intermittent operation mode when the measured indoor temperature is less than or equal to the first temperature threshold and the measured indoor humidity is greater than the upper limit humidity threshold, and during execution of the intermittent operation mode, switch from the intermittent operation mode to the operation stop mode when the measured indoor temperature is greater than the second temperature threshold, where the second temperature threshold is greater than the first temperature threshold and the measured indoor humidity is less than or equal to the lower limit humidity threshold.

12. The air-conditioning apparatus of claim 11, wherein during execution of the continuous operation mode, the controller is configured to:
continue the continuous operation mode when the measured indoor temperature is greater than or equal the first temperature threshold, and
switch from the continuous operation mode to the operation stop mode when the measured indoor temperature is less than or equal to the first temperature threshold and the measured indoor humidity is less than or equal to the lower limit humidity threshold.

13. The air-conditioning apparatus of claim 11, wherein during execution of the intermittent operation mode, the controller is configured to:
continue the intermittent operation mode when the measured indoor temperature is less than or equal the second temperature threshold, and
switch from the intermittent operation mode to the continuous operation mode when the measured indoor temperature is greater than the second temperature threshold, the second temperature threshold is greater than the first temperature threshold, and the measured indoor humidity is greater than the lower limit humidity threshold.

14. The air-conditioning apparatus of claim 11, wherein during execution of the operation stop mode, the controller configured to:
continues the operation stop mode when the measured indoor temperature is less than the second temperature threshold,
switch from the operation stop mode to the continuous operation mode when the measured indoor temperature is greater than or equal to the second temperature threshold and the measured indoor humidity is greater than the upper limit humidity threshold, and
switch from the operation stop mode to the intermittent operation mode when the measured indoor temperature is greater than or equal to the second temperature threshold and the measured indoor humidity is less than or equal to the upper limit humidity threshold.

* * * * *